US009082542B2

(12) United States Patent
Shinohara

(10) Patent No.: US 9,082,542 B2
(45) Date of Patent: Jul. 14, 2015

(54) REACTOR

(75) Inventor: Nobuki Shinohara, Toyota (JP)

(73) Assignee: TOYOTA JIDOSHA KABUSHIKI KAISHA, Toyota-Shi (JP)

( * ) Notice: Subject to any disclaimer, the term of this patent is extended or adjusted under 35 U.S.C. 154(b) by 148 days.

(21) Appl. No.: 13/985,403

(22) PCT Filed: Feb. 18, 2011

(86) PCT No.: PCT/JP2011/053550
§ 371 (c)(1),
(2), (4) Date: Aug. 14, 2013

(87) PCT Pub. No.: WO2012/011153
PCT Pub. Date: Aug. 23, 2012

(65) Prior Publication Data

US 2013/0320757 A1 Dec. 5, 2013

(51) Int. Cl.

| | |
|---|---|
| ***H01F 27/255*** | (2006.01) |
| ***H01F 3/14*** | (2006.01) |
| *B60L 1/00* | (2006.01) |

(52) U.S. Cl.
CPC ................ *H01F 27/255* (2013.01); *H01F 3/14* (2013.01)

(58) Field of Classification Search
USPC .......................................................... 307/9.1
See application file for complete search history.

(56) References Cited

U.S. PATENT DOCUMENTS

2010/0171580 A1 7/2010 Abe et al.

FOREIGN PATENT DOCUMENTS

| | | | |
|---|---|---|---|
| JP | 10-112410 | A | 4/1998 |
| JP | 11307349 | A | 11/1999 |
| JP | 2003-173918 | A | 6/2003 |
| JP | 2005-50918 | A | 2/2005 |
| JP | 2005-064002 | A | 3/2005 |
| JP | 2006-237030 | A | 9/2006 |
| JP | 2006-344867 | A | 12/2006 |
| JP | 2006-344868 | A | 12/2006 |
| JP | 2006-351675 | A | 12/2006 |
| JP | 2008-141012 | A | 6/2008 |
| JP | 2009-071248 | A | 4/2009 |
| WO | 2008087885 | A1 | 7/2008 |

OTHER PUBLICATIONS

Espacenet, English-language abstract of WO2008087885.
Espacenet, English-language abstract of JP2005050918.
English-language machine translation of JP2005050918.

*Primary Examiner* — Robert Deberadinis
(74) *Attorney, Agent, or Firm* — Kenyon & Kenyon LLP

(57) ABSTRACT

A reactor, which enables costs to be reduced while ensuring specific specifications for an electric vehicle such as an HV vehicle, is provided. The reactor for an HV vehicle includes: a reactor core in which a pair of roughly U-shaped core members, which have been integrally formed using an Fe—Si magnetic powder, are arranged in a circular shape by aligning two leg sections of each core member opposite to each other with gaps therebetween; and coils wound around the periphery of the leg sections of the core members, which are positioned opposite to each other with the gaps therebetween.

7 Claims, 10 Drawing Sheets

REACTOR

CROSS REFERENCE TO RELATED APPLICATION

This is a national phase application based on the PCT International Patent Application No. PCT/JP2011/053550 filed on Feb. 18, 2011, the entire contents of which are incorporated herein by reference.

TECHNICAL FIELD

The present invention relates to reactors, in particular to a reactor used for a converter in an electric vehicle which includes a rotary electric machine as an output source of power, a power supply for supplying driving electrical power to the rotary electric machine, and a converter for converting DC voltage supplied from the power supply and outputting the converted voltage to the rotary electric machine.

BACKGROUND ART

Hybrid vehicles (hereinafter also referred to as "HV") mounted with an engine and a motor as power sources are known. HVs are provided with a DC power supply such as a rechargeable secondary cell. HVs drive the motor by electrical power supplied from the DC power supply. In this case, in order to improve running performance of the vehicle, a boost converter may be used as a boosting device which boosts the DC voltage from the DC power supply and supplies the boosted voltage to the motor.

A boost converter for an HV generally includes a reactor and power switching elements such as IGBTs. The reactor includes a reactor core in which two or more core members made of magnetic materials are successively arranged via intervening gaps to form an annular shape, and coils which are wound around the core members. In a reactor constructed in such a manner, a chopper boosting operation is performed in which electrical energy supplied from the DC power supply is temporarily stored as magnetic energy in the reactor cores and discharged, by controlling ON and OFF states of the switching elements in a high-speed cycle.

As a conventional art document related to a reactor described above, for example, JP 2006-237030 A (hereinafter referred to as "Patent Document 1") discloses an iron core with an object to provide a core having an easy axis of magnetization along the direction of a magnetic path over the entire region and capable of being constructed from a minimum number of required iron core strips without dividing the core strips for every linear region. This iron core is constructed from a pair of U-shaped iron core strips, each of which has an easy axis of magnetization along the magnetic path. Each iron core strip is constituted by laminating two or more oriented electromagnetic steel plates in a direction perpendicular to the easy axis of magnetization. The iron core strip is made up of three iron core portions successively positioned in the direction of the easy axis of magnetization. The adjacent two iron core portions are connected to each other at a coupling portion located at an end portion on an outer peripheral side of the U-shaped magnetic path. End surfaces which are formed in a direction perpendicular to the easy axis of magnetization at an end portion of the easy axis of magnetization of both of the adjacent iron core portions are arranged to face each other in such a manner that the easy axes of magnetization of both of the iron core portions are successively arranged along the magnetic path.

Further, as another conventional art document, JP 2009-71248 A (hereinafter referred to as "Reference 2") discloses a reactor with an object to reduce copper loss and describes, as the most suitable structure, a magnetic core structure of a composite magnetic reactor core in which a ferrite magnetic core and pressurized powder magnetic core are combined. This reactor is an annular reactor made up of two ferrite magnetic core joints opposing each other, two or more magnetic core length portions which are arranged between the magnetic core joints and composed of pressurized powder body made up of soft magnetic powder and resin, and coils wound around the core length portions. The magnetic core length portions are constructed from two or more blocks which are successively arranged via intervening gaps. The intervening gaps are positioned on the inner side of the coils.

RELATED ART DOCUMENT

Patent Document

Patent Document 1: JP 2006-237030 A
Patent Document 2: JP 2009-71248 A

DISCLOSURE OF THE INVENTION

Objects to be Achieved by the Invention

The iron core of the above Patent Document 1 has a disadvantage of increased cost required for materials and processing because the iron core strips are formed by laminating electromagnetic steel plates. This disadvantage can also be found in the compound magnetic core reactor of the above Patent Document 2 in which magnetic cores made up of different materials, namely, a ferrite magnetic core and a pressurized powder magnetic core, are combined.

Further, for a reactor of a boost converter mounted on an electric vehicle such as HV, aiming at cost reduction alone is not enough. Specific specifications required in view of vehicle running performance or the like should also be ensured.

An object of the present invention is to provide a reactor which can achieve cost reduction while ensuring specific specifications for electric vehicles such as HVs.

Means for Achieving the Objects

A reactor according to the present invention is a reactor used in a converter in an electric vehicle comprising a rotary electric machine used as an output source of power, a power supply for supplying driving electrical power to the rotary electric machine, and the converter converting DC voltage supplied by the power supply and outputting the converted voltage to the rotary electric machine, the reactor comprising: a reactor core which is configured to have an annular shape in which a pair of substantially U-shaped core members, each being made from Fe—Si system magnetic powder as one body, are arranged such that the leg portions of each of the core members oppose the leg portions of the other core member with intervening gaps; and coils wound around the leg portions of each of the core members opposing each other via the intervening gaps.

In a reactor according to the present invention, it is preferable that a length of each of the intervening gap is 2 to 3 mm and a total length of the two gaps included in the reactor core is 6 mm or less; a cross-sectional area of each of the core members is 400 to 2000 mm$^2$; and a number of turns of the coils is 20 to 60 turns.

In a reactor according to the present invention, each of the core members may have leg portion end surfaces and a cross-section, both having a rectangular shape; and a distance between an outer peripheral surface of each of the leg portions and an inner circumference of the coil on an outer circumference side of the annular reactor core may be longer than a distance between an inner peripheral surface of each of the leg portions and the inner circumference of the coil on an inner circumference side of the reactor core.

In a reactor according to the present invention, each of the core members may have leg portion end surfaces and a cross-section, both having a rectangular shape; and a corner cut-off process may be applied to an edge portion defined by the end surface and the inner peripheral surface of each of the leg portions and to an edge portion defined by the end surface and the outer peripheral surface of each of the leg portions such that the intervening gaps between the leg portions of the core members become wider at a position closer to the inner peripheral surface and at a position closer to the outer peripheral surface of each of the leg portions.

In a reactor according to the present invention, the core members may have a uniform vertical cross section of a vertically long rectangular shape when an upper surface and a lower surface of each of the core members are placed horizontally; and a protruding length of the leg portions may be formed shorter than a vertical length of the rectangular.

Effects of the Invention

According to a reactor of the present invention, it becomes possible to reduce cost required for materials and processing in comparison with reactors using an iron core with laminated electromagnetic steel plates or a compound magnetic core, while ensuring specific specifications for electric vehicles such as HVs by arranging a reactor to include a reactor core which is configured to have an annular shape by arranging a pair of substantially U-shaped core members, each having two leg portions and each being made from Fe—Si system magnetic powder as one body, to oppose each other via two intervening gaps; and coils which are wound around leg portions of each of the core members opposing each other via the intervening gaps.

BEST MODE FOR CARRYING OUT THE INVENTION

Embodiments according to the present invention (hereinafter referred to as “embodiments”) are described in detail below by referring to the attached drawings. The specifics such as shapes, materials, numerals, and directions in the description are presented merely for facilitating understanding of the present invention and are changeable in accordance with usages, purposes, specifications, or the like.

Although a hybrid vehicle provided with two motor generators (rotary electric machines), each having a motor function and a power generation function, is described below, such a structure is provided merely as an example. A hybrid vehicle may include one motor with a motor function alone and the other motor with a power generation function alone, or alternatively, one motor generator only, or three or more motor generators. Further, although a hybrid vehicle provided with an engine and a motor as power sources is described below as an example, the present invention may be applied to an electric vehicle such as one with a motor alone as a power source.

Figure 1:
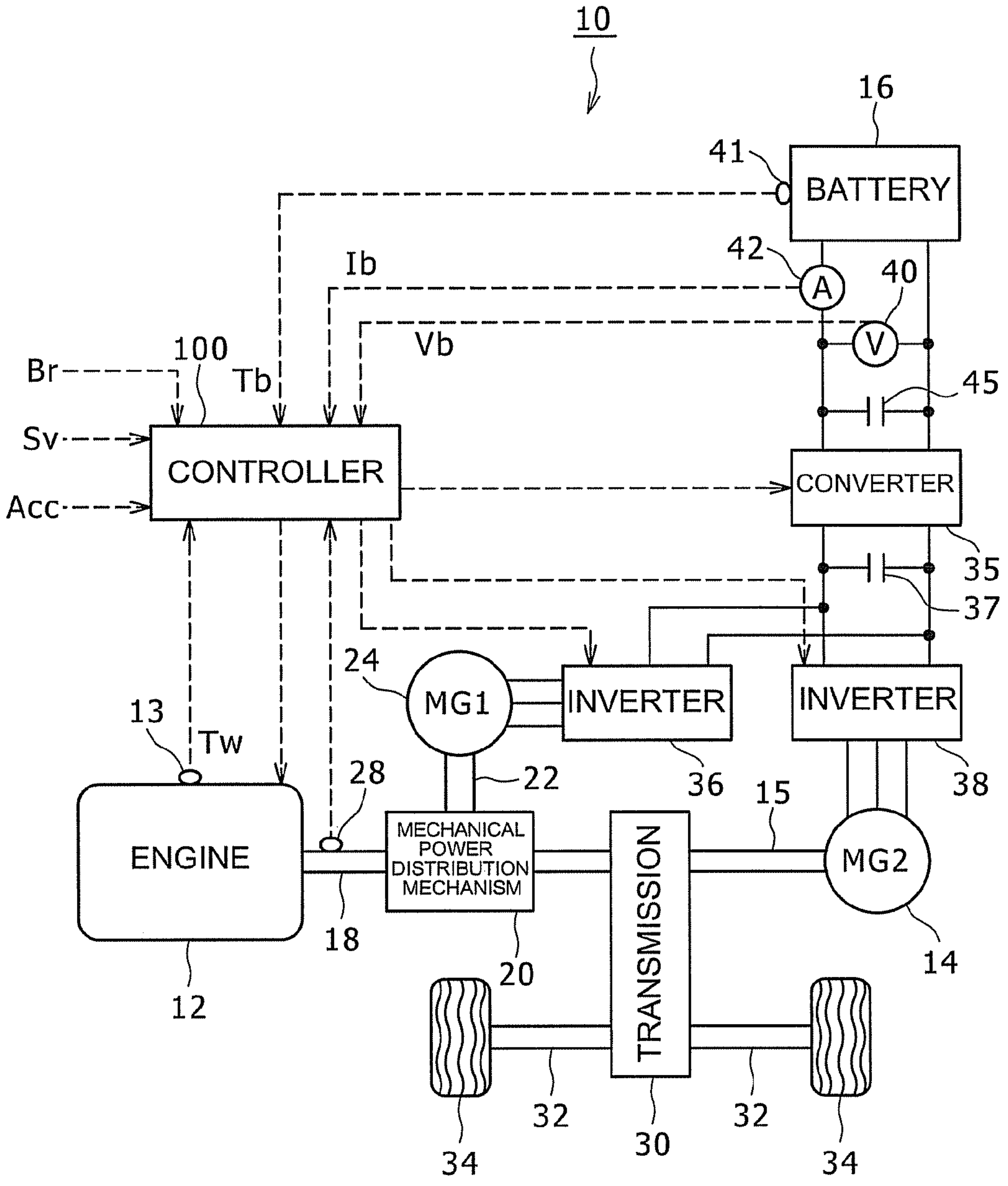
FIG. 1 is a schematic diagram of hybrid vehicle (HV).
Figure 2:
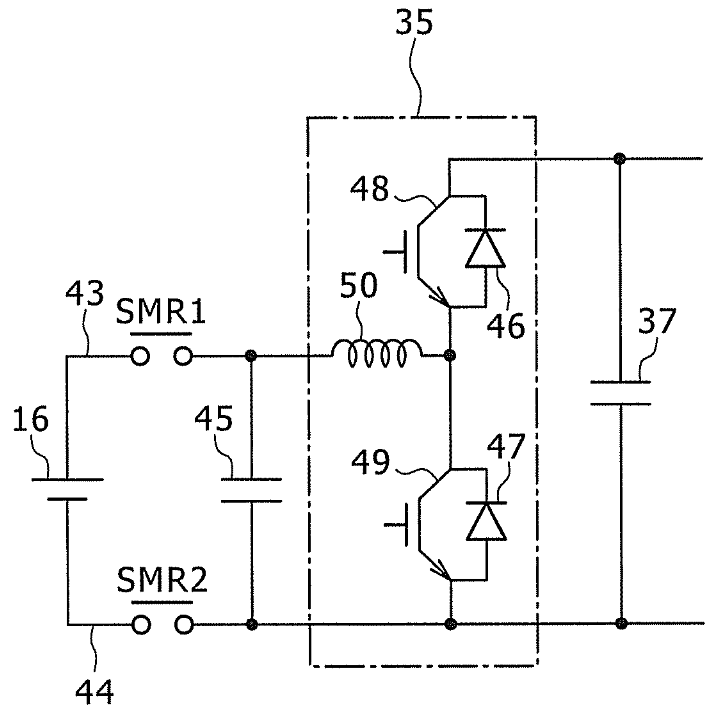
FIG. 2 is a circuit diagram showing a boost converter in FIG. 1.

FIG. 1 is a schematic diagram of a hybrid vehicle 10 mounted with a boost converter (hereinafter referred to as merely “converter” as appropriate) 35 using a reactor 50 according to the present embodiment. FIG. 2 is a diagram showing a circuit configuration of the converter 35. In FIG. 1, power transmission systems are shown by double lines indicating shaft elements; electrical systems are shown by solid single lines; and signal systems are shown by single dashed lines.

As shown in FIG. 1, the hybrid vehicle 10 is provided with an engine 12 as a running power source, a motor 14 (shown as “MG2” in FIG. 1) as another running power source, a motor 24 (shown as “MG1” in FIG. 1) to which a power distribution mechanism 20 connected with an output shaft 18 of the engine 12 is connected via a shaft 22, a battery (power supply) 16 which can supply drive electrical power to each of the motors 14, 24, and a controller 100 which totally controls each operation of the above engine 12 and the motors 14, 24, and further controls charge and discharge of the battery 16.

The engine 12 is an internal combustion engine which uses fuel such as gasoline and light oil. The operations of the engine 12, such as tracking, opening angle of throttle, amount of fuel injection, and ignition timing, are controlled in accordance with commands from the controller 100, leading to control of the start, operation, and stop of the engine 12.

A rotation speed sensor 28 which senses the rotational speed Ne of the engine is positioned adjacent to the output shaft 18 which extends from the engine 12 to the power distribution mechanism 20. The engine 12 is provided with a temperature sensor 13 which senses temperature of coolant water used as engine cooling media. The values sensed by the rotation speed sensor 28 and the temperature sensor 13 are sent to the controller 100.

The power distribution mechanism 20 may preferably be constituted by, for example, a planetary gear train. The power input from the engine 12 to the power distribution mechanism 20 via the output shaft 18 is transmitted to drive wheels 34 via a transmission 30 and axles 32 such that the vehicle 10 can run on the power from the engine.

The transmission 30 may have a function to decelerate and output rotational input from at least one of the engine 12 and the motor 14. The transmission 30 may also be switchable among two or more gear stages in accordance with commands from the controller 100. The transmission mechanism used by the transmission 30 may have any well-known configuration. Further, instead of step-wise transmission, continuously variable transmission mechanism may be used such that speed is smoothly and continuously variable.

The above power distribution mechanism 20 can output, to the motor 24 via the shaft 22, a part or all of power input from the engine 12 via the output shaft 18. Here, the motor 24 which may be preferably constituted by, for example, a three-phase synchronous AC motor can function as a power generator. The three-phase AC voltage generated by the motor 24 is converted to DC voltage by an inverter 36 and charged to the battery 16 or used as drive voltage for the motor 14.

Further, the motor 24 may also function as an electric motor which is rotated by electrical power supplied from the battery 16 via the converter 35 and the inverter 36. The power which is output to the shaft 22 by rotating the motor 24 is input to the engine 12 via the power distribution mechanism 20 and the output shaft 18 to enable cranking. Further, power obtained by rotating the motor 24 using the electrical power supplied from the battery 16 may be used as the power for running by outputting the power to the axles 32 via the power distribution mechanism 20 and the transmission 30.

The motor 14 mainly functioning as an electric motor may preferably be constituted by a three-phase synchronous AC motor. The motor 14 is rotated by the DC voltage which is supplied from the battery 16, boosted by the converter 35 if necessary, and then converted to three-phase AC voltage by the inverter 38 and applied as a drive voltage. The power which is output to the shaft 15 by driving the motor 14 is transmitted to the drive wheels 34 via the transmission 30 and the axles 32. In this way, so-called EV running is performed with the engine 12 at halt. Further, the motor 14 has a function to assist engine output by outputting power for running upon receipt of a rapid acceleration request from a driver through an accelerator pedal operation.

As the battery 16, for example, rechargeable secondary batteries, such as lithium ion batteries and nickel hydrogen batteries, or an electrical power storage device such as an electric double layer capacitor, may be preferably used. The battery 16 is provided with a voltage sensor 40 which senses battery voltage Vb, a current sensor 42 which senses battery current Ib input to or output from the battery 16, and a temperature sensor 41 which senses battery temperature Tb. The values sensed by the respective sensors 40, 41, 42 are input to the controller 100 to be used to control the state of charge (SOC) of the battery 16.

As shown in FIG. 2, a positive electrode bus 43 and a negative electrode bus 44 are respectively connected to each terminal at a positive electrode and a negative electrode of the battery 16. The positive electrode bus 43 and the negative electrode bus 44 are provided with system main relays SMR1, SMR2. The system main relays SMR1, SMR2 are capable of switching between connection and disconnection so as to cut-off a high-voltage power supply system from the motors 14, 24 and others when the motors 14, 24 are at a halt or the like. The connection and disconnection of the system main relays SMR1, SMR2 is controlled by a control signal sent from the controller 100.

Electrical power is supplied from the battery 16 to the converter 35 via a smoothing capacitor 45 which suppresses voltage and current fluctuations. The converter 35 includes a reactor 50 and two switching elements 48, 49 (for example, IGBT), in each of which diodes 46, 47 are connected in inverse-parallel. The converter 35 is a circuit with a function to boost DC voltage supplied from the battery 16 by using an energy storage effect of the reactor 50. Having a bidirectional function, the converter 35 also has a function to step down a high voltage from the inverters 36, 38 side to a voltage appropriate for charging to the battery 16 when electrical power is supplied from the inverters 36, 38 side to the battery 16 side for charging electrical power.

The output voltage from the converter 35 is supplied to the inverters 36, 38 via a smoothing capacitor 37 which suppresses voltage and current fluctuations. The output voltage is then converted by the inverters 36, 38 to an AC voltage which is applied to the motors 14, 24 as a drive voltage.

The controller 100 is preferably configured to include a microcomputer with a CPU executing various control programs, a ROM storing, in advance, control programs, control maps, or the like, a RAM temporarily storing control programs read from the ROM and sensed values from each sensor, etc. The controller 100 includes an input port, which receives inputs including the engine rotational speed Ne, battery current Ib, battery voltage Ib, battery temperature Tb, accelerator position signal Acc, vehicle speed Sv, brake operation signal Br, engine cooling water temperature Tw, and a system voltage which is an output voltage of the converter 35 or input voltage of the inverter 36, and an output port, which outputs a control signal for controlling operation and activation of the engine 12, the converter 35, the inverters 36, 38, or the like.

Although the present embodiment is described assuming that the operation control and status monitor of the engine 12, motors 14, 24, converter 35, inverters 36, 38, battery 16, or the like are performed by using a single controller 100, it is also possible to separately provide an engine electronic control unit (ECU) which controls operation status of the engine 12, a motor ECU which controls driving of the motors 14, 24 by controlling operation of the converter 35 and the inverters 36, 38, and a battery ECU which controls the SOC of the battery 16, or the like such that the above controller 100 is configured to function as a hybrid ECU to perform overall control of the above ECUs.

Further, a clutch mechanism may be disposed in the above hybrid vehicle 10 to intermittently provide transmission of drive power between at least one of the engine 12 and the mechanical power distribution mechanism 20, the mechanical power distribution mechanism 20 and the motor 24, the mechanical power distribution mechanism 20 and the transmission 30, and the motor 14 and the transmission 30.

Figure 3:
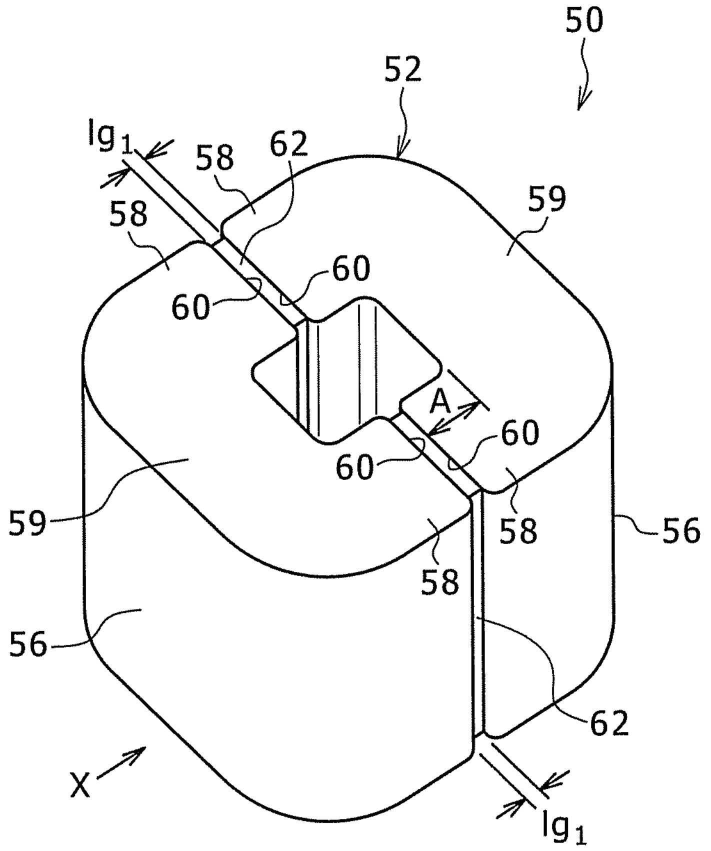
FIG. 3 is a perspective diagram showing a core of a reactor according to one embodiment of the present invention.
Figure 4:
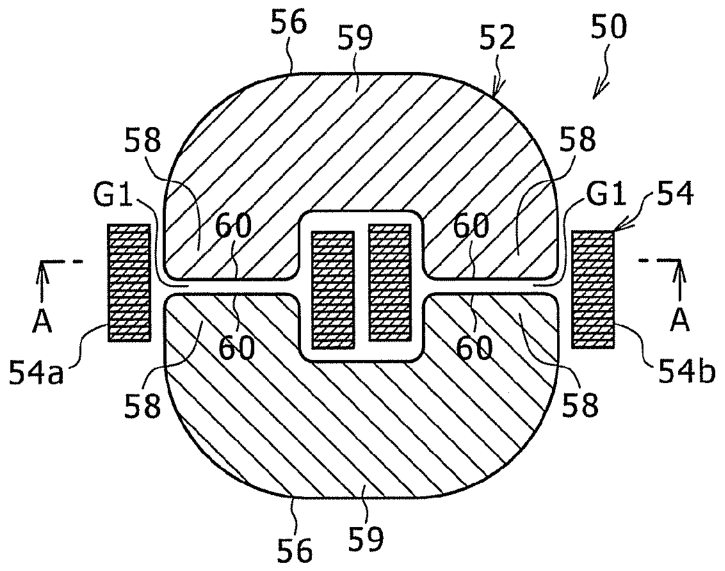
FIG. 4 is a horizontal cross-sectional view of a reactor according to the present embodiment.
Figure 5:
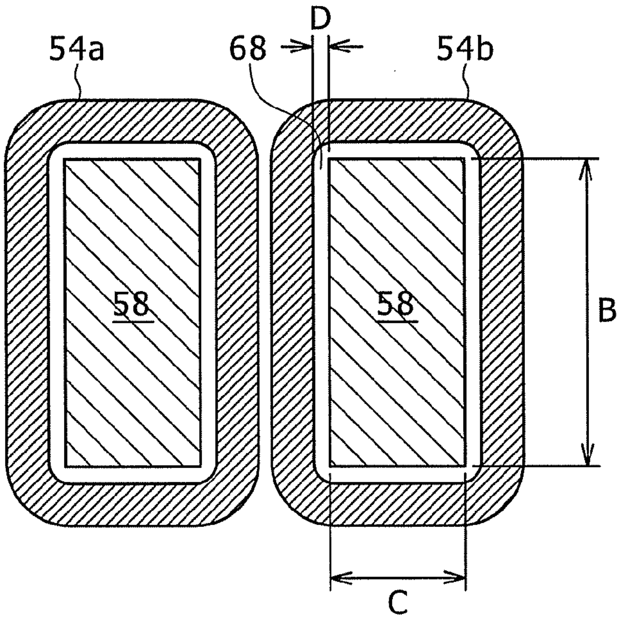
FIG. 5 is a vertical cross-sectional view of a reactor according to the present embodiment.
Figure 6:
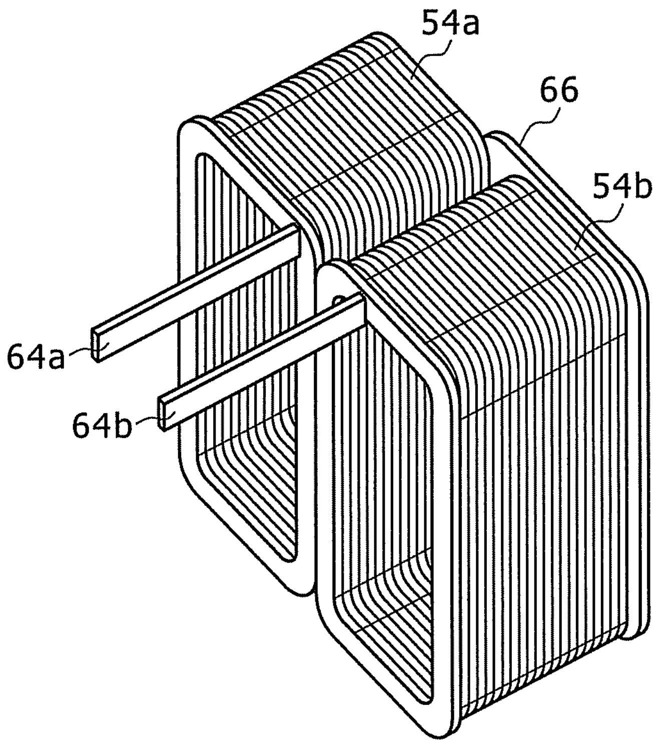
FIG. 6 is a perspective diagram of coils constituting a reactor according to the present embodiment.

Next, a reactor 50 according to the present embodiment will be described below with reference to FIGS. 3 to 6. FIG. 3 is a perspective diagram showing a reactor core 52 of the reactor 50 according to the present embodiment. FIG. 4 is a drawing showing a horizontal cross-sectional view of the reactor 50. FIG. 5 shows a vertical cross-sectional view taken along the line A-A of FIG. 4. Further, FIG. 6 is a perspective diagram of a coil 54 constituting the reactor 50.

The reactor 50 has a reactor core 52 and a coil 54. The reactor core 52 is formed from a pair of core members 56, each having substantially U-shaped or bracket-shaped top and bottom surfaces (and cross-section). Each of the core members 56 includes two leg portions 58 which protrude in parallel and a base portion 59 connecting these leg portions 58. The end surfaces 60 of respective leg portions 58 may be formed as a vertically-long rectangular shape when the core members 56 are viewed from the X direction with the top and bottom surfaces placed horizontally. Further, each of the core members 56 may have a uniform cross section having the same rectangular shape as the end surfaces 60 from one end surface of the leg portion 58 to the other end surface of the leg portion 58.

The core members 56 are made from pressurized powder magnetic cores having electromagnetic properties of high linearity. Specifically, the core members 56 are formed as one body by adding binder to Fe—Si system magnetic powder coated by an insulation film and by pressure-forming. As the Fe—Si system magnetic powder, it is preferable to use, for example, Fe-3% Si magnetic powder. However, the Fe—Si system magnetic powder is not limited to this example. For example, Fe-1% Si magnetic powder, Fe-6.5% Si magnetic powder, Fe—Si—Al magnetic powder or the like may be used.

The reactor core 52 is formed to have an annular shape by placing the above two core members 56 such that the end surfaces 60 of the respective leg portions 58 oppose the end surfaces 60 of the other leg portion 58 via gaps G1 having a predetermined length. In each gap G1, a gap plate 62 made from non-magnetic material such as ceramic is sandwiched and adhesively fixed. By providing the gap plate 62 therebetween, the length $lg_1$ can be accurately defined. In the reactor 50 according to the present embodiment, the length $lg_1$ of the gap G1 may be preferably set to 2 to 3 mm, resulting in a total length of the two gaps ($2\times lg_1$) being 6 mm or less.

In the reactor core 52 according to the present embodiment, the length A of the leg portions 58 projecting from the base portion 59 in the core members 56 may be formed shorter than the length B (refer to FIG. 5) in the vertical direction of the vertical cross-section of the core members 56. In this way, the length in the horizontal direction (direction X) of the reactor core 52 which is formed by connecting the two core members 56 via the gaps G1 can be made shorter, and thus it becomes possible to reduce the size of the reactor 50 formed from the two U-shaped core members 56 in the direction X. Further, for the reactor 50 according to the present embodiment, it is preferable to make the sectional area of the vertical rectangular shape portion from 400 to 2000 $mm^2$.

As shown in FIGS. 4 and 6, the coil 54 is divided into two coil portions 54*a*, 54*b*. It is preferable that the total number of turns N of the two coil portions 54*a*, 54*b* is 20 to 60. The coil portion 54*a* includes an input end 64*a* connected to the battery 16 side, while the coil portion 54*b* includes an output end 64*b* connected to the switching elements 48, 49 side. The coil portions 54*a*, 54*b* are electrically connected to each other by a connecting portion 66.

The coil portions 54*a*, 54*b* are wound around the leg portions 58 of the pair of core members 56 opposing each other via the gaps G1. The coil 54 is formed from an edgewise coil in which conductive wire such as flat copper wire is wound. Electrical insulation is provided between the adjacent turns of the coil 54 by an insulation material such as enamel which coats the coil 54 itself. Further, the electrical insulation between the turns may be enforced by tightly winding the coil 54 with an insulation member such as insulation paper between turns of the coil 54. Furthermore, the electrical insulation between the turns may be further enforced by winding the coil 54 so as to form a space between adjacent turns and filling the space with a resin molding material which may be applied later.

Although the coil 54 is assumed to be formed from an edgewise coil in the present embodiment, the coil 54 is not limited to such a coil. The coil 54 may be formed by winding, for example, conductive wire having circular cross-section. Further, the coil portions 54*a*, 54*b* which form the coil 54 may be positioned around the reactor core 52 in such a manner that the coil portions 54*a*, 54*b* are wound around the outer circumferences of, for example, resin bobbins.

As shown in FIG. 5, a space 68 having a distance D is provided between the inner circumference of each of the coil portions 54*a*, 54*b* and the outer peripheral surface of each of the core members 56. In the present embodiment, the above space 68 is formed uniformly along the four circumference sides of the leg portions 58 of the core members 56. If the space 68 is too small, coil loss will be increased due to the linkage of leakage flux which leaks outwardly from the leg portions 58 of the core members 56 at a point within the gaps G1. On the other hand, if the space 68 is too large, the cost will be increased due to the longer conductive wire of the coil, and the size of the reactor 50 will be larger. Therefore, it is preferable to optimally set the distance D of the above space 68 by considering all of the coil loss, cost, and the size of the reactor.

Figure 7:
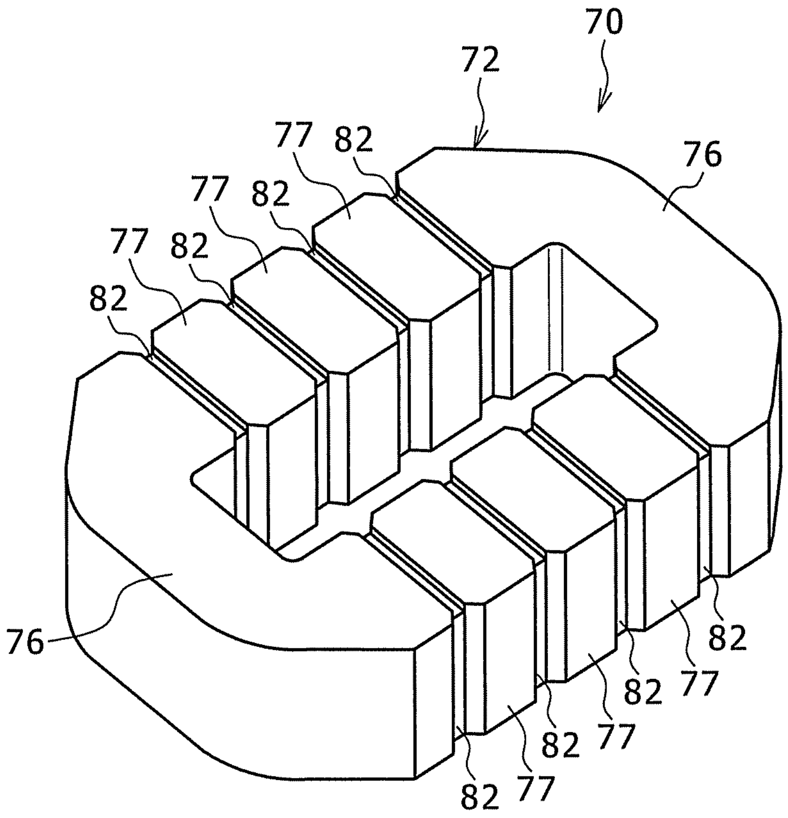
FIG. 7 is a perspective diagram of a reactor core of an example conventional art.
Figure 8:
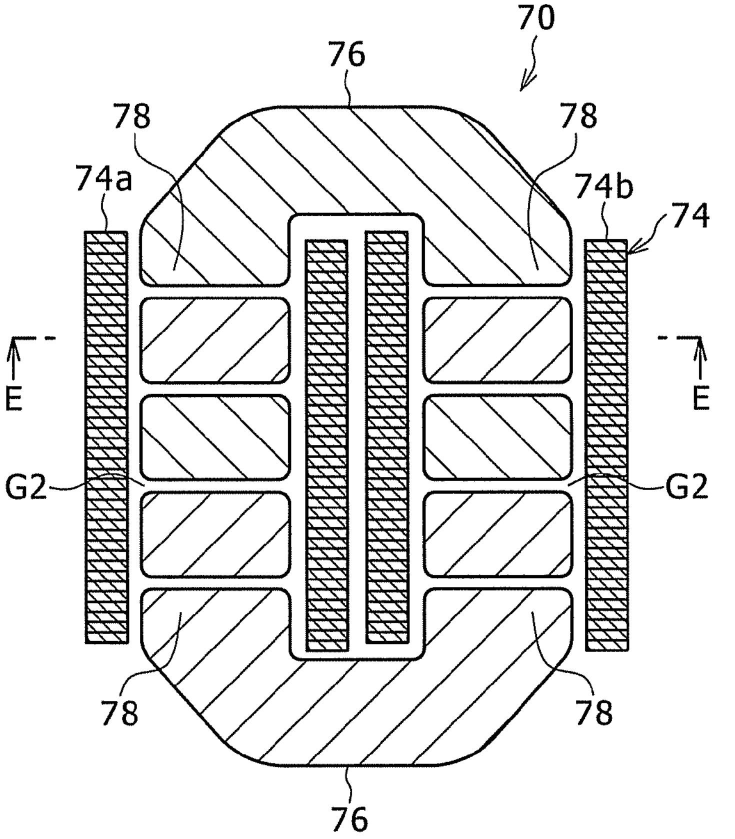
FIG. 8 is a horizontal cross-sectional view of the reactor of the example conventional art.
Figure 9:
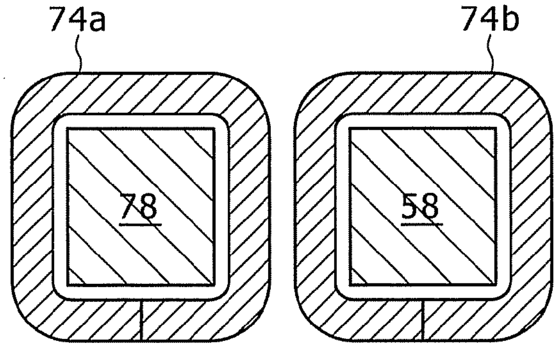
FIG. 9 is a vertical cross-sectional view of the reactor of the example conventional art.

FIGS. 7 to 9 show a known reactor 70 for a HV as a comparative example. FIG. 7 shows a perspective view of a reactor core 72 of the reactor 70, FIG. 8 shows a horizontal cross-sectional view of the reactor 70, and FIG. 9 shows a vertical cross-sectional view taken along the line E-E of FIG. 8.

The reactor 70 includes the reactor core 72 and a coil 74. The reactor core 72 is formed in an annular shape in which three cuboid core blocks 77 are successively placed between leg portions of a pair of U-shaped core members 76. Gap plates 82 are sandwiched between the core members 76 and the cuboid core blocks 77 and between the adjacent cuboid core blocks 77. The gaps G2 are formed at eight places in total. Therefore, in the reactor 70, the total gap length included in the annular magnetic path becomes $8\times lg^2$ where the length of a single gap G2 is $lg^2$.

Further, the two coil portions 74*a*, 74*b* constituting the coil 74 are successively placed from the circumference of the leg portion 78 of one core member 76 to the circumference of the leg portion 78 of the other core member 76. Further, as shown in FIG. 9, the vertical cross-section of the reactor core 72 has a substantially square shape which is uniformly maintained around the entire circumference of the annular reactor core 72.

In this comparative example, the core members 76 and the core blocks 77 are formed from a laminate of silicon steel plates, each having 0.3 mm plate thickness. The number of coil turns is 60 to 80 turns, with the vertical cross-sectional area of the core being about 600 $mm^2$, and the gap length $lg^2$ being about 2 mm, resulting in the total gap length of 16 mm ($8\times lg^2$) or longer.

Next, capabilities of the reactor 50 according to the present embodiment are described. Generally, inductance L of a reactor can be obtained by the following equations (1) and (2).

$$L = N\cdot S\frac{dB}{dI} \tag{1}$$

$$L = \frac{\mu_0\cdot N^2\cdot S}{\frac{l_{core}}{\mu'}+l_{gap}} \approx \frac{\mu_0\cdot N^2\cdot S}{l_{gap}} \tag{2}$$

wherein

N: Number of turns

S: Core cross-sectional area $\mu_0$: Vacuum permeability $\mu'$: Relative permeability lcore: Magnetic path length lgap: Gap length In Equation (1), the inductance L is obtained by multiplying the number of coil turns N, the core cross-sectional area S, and variation of the magnetic flux density with respect to coil current I (dB/dI). On the other hand, in Equation (2), inductance L is obtained by using, in place of the variation of the magnetic flux density, core magnetic path length lcore, the total gap length lgap, vacuum permeability $\mu_0$, and relative permeability $\mu'$. In this case, because lcore/$\mu'$ in the denominator is small enough with respect to lgap, lcore/$\mu'$ can be ignored. Therefore, it can be understood that the design parameters of the inductance L are the number of coil turns N, the core cross-section area S, and the total gap length lgap.

Further, because the reactor 50 according to the present embodiment is used for a boost converter 35 mounted on a HV, it is necessary to meet specific specifications for a HV. For example, as the switching elements 48, 49 of the converter 35, switching elements having drive frequency f of 5 to 15 kHz are used. Therefore, as ripple current is expected to flow by switching in such a frequency range, the reactor core 52 is required to have the inductance L so as to avoid magnetic saturation under such conditions. Further, it is preferable that the reactor 50 has DC bias characteristics around 100 to 200 A depending on the specifications of the traction motor 14 in order to ensure desired running performance of the HV. In addition to meeting the specifications as an HV reactor such as those shown above, the reactor 50 according to the present embodiment is designed to reduce material and processing costs and to improve NV performance.

Figure 10:
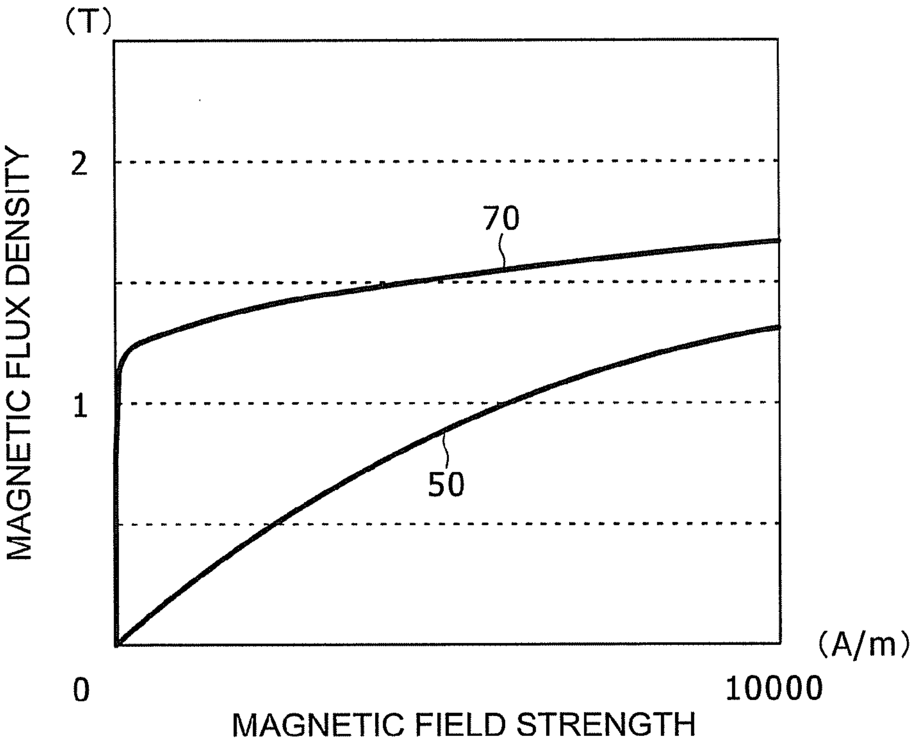
FIG. 10 is a graph showing a relationship between magnetic field strength and magnetic flux density for a reactor according to the present embodiment, in which the reactor is constructed from a magnetic core made from Fe—Si system pressurized powder, and a reactor of the example conventional art shown in FIGS. 7 to 9 with a magnetic core with laminated electromagnetic steel plates.

FIG. 10 is a graph showing a relationship between magnetic field strength and magnetic flux density for the reactor 50 according to embodiments of the present invention made from a Fe—Si system pressurized powder magnetic core and the reactor 70 of an example conventional reactor. The same reference numerals as the reactors 50 and 70 are assigned to the two corresponding curves in the graph.

It can be recognized that with the reactor 70 with the core made from a laminate of electromagnetic steel plates, the magnetic flux density increases rapidly with respect to a slight change in the magnetic field strength, indicating likelihood of reaching magnetic saturation. On the contrary, with the reactor 50 according to the present embodiment, the occurrence of magnetic saturation and the resulting performance deterioration of the reactor can be avoided because of the almost constant change of the magnetic flux density in a wide range of the magnetic field strength achieved by forming the reactor core 52 from a pressurized powder magnetic core made from Fe—Si system magnetic powder.

Further, regarding the material cost, the reactor core 52 made from Fe—Si system magnetic powder can drastically reduce cost in comparison to a reactor core made from electromagnetic steel plates.

Furthermore, because the core members 56 according to the present embodiment are made from magnetic powder of one type as one body, processing cost, as well as material cost, can be reduced in comparison to the compound magnetic core which is formed by combining two or more types of magnetic core.

Still further, because, in comparison to the reactor 70 as the example conventional art shown in FIGS. 7 to 9, the reactor 50 according to the present embodiment can drastically reduce the number of components in the core, advantages of not only reduced cost of material, processing, management, or the like, but also easier assembly, can be achieved. Furthermore, because the number of the gaps can be reduced from 8 to 2 in the reactor 50, the coil loss caused by the linkage of leakage flux at the gaps can also be drastically reduced, resulting in improvement of gas mileage. Because the number of the required gap plates can be reduced accordingly, the cost of the gap plates can also be reduced.

Further, because, in the reactor core 52 according to the present embodiment, the projection length A of the leg portions 58 from the base portion 59 in the core members 56 is shorter than the length B in the vertical direction of the vertical cross section of the core members 56, the horizontal length (in the direction X) of the reactor core 52 made up of the two core members 56 can be much shorter than that of the reactor 70, resulting in downsizing. In this way, it becomes further possible to reduce noise and vibration (NV) of the reactor core 52 caused by ripples of the coil current.

Figure 11:
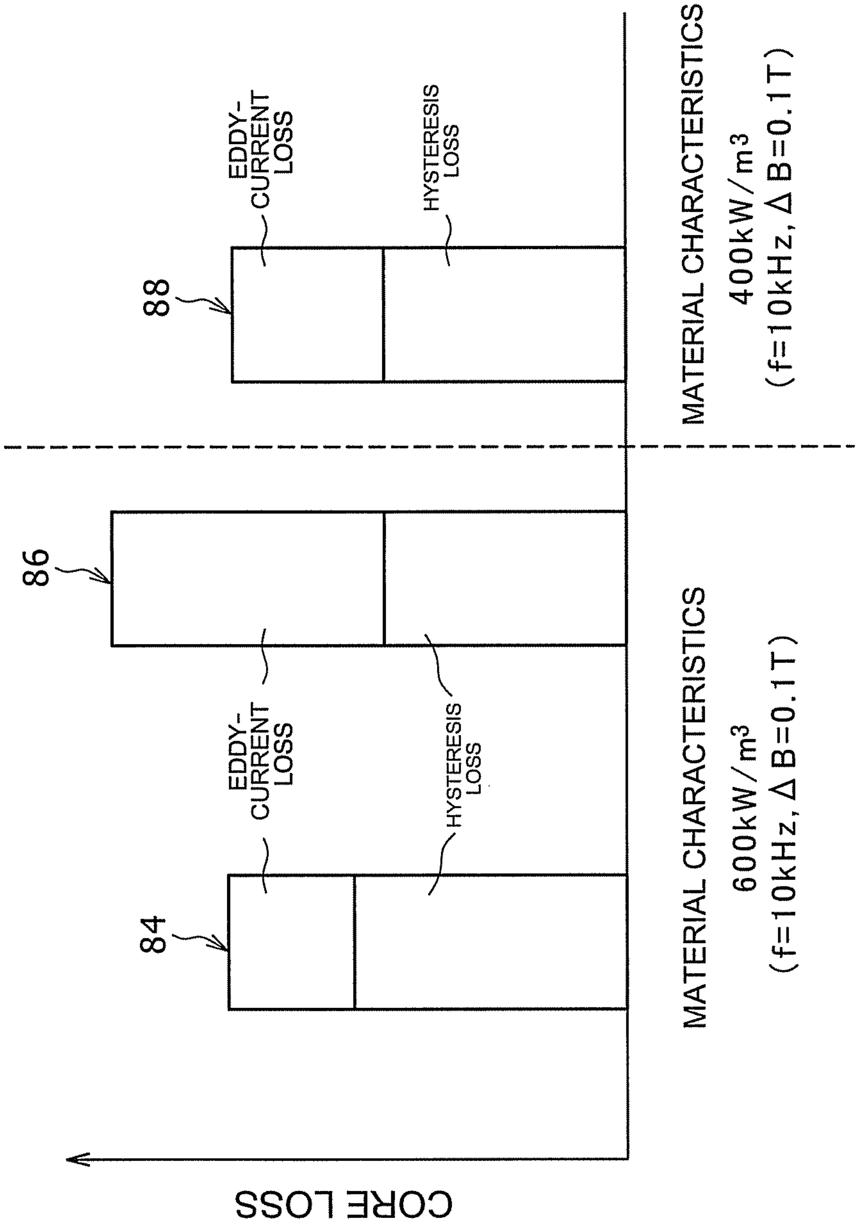
FIG. 11 is a diagram showing core loss at a reactor core according to the present embodiment.

FIG. 11 is a graph describing core loss at the reactor core 52 according to the present embodiment. Generally, in reactor cores, core loss occurs due to a change in core magnetic flux density caused by ripple current flowing in the coil. The core loss is divided into two groups, namely, hysteresis loss used as energy to change the magnetic flux and eddy-current loss which is joule loss caused by induced current (eddy current) generated inside the magnetic powder due to a change in the magnetic flux density.

In FIG. 11, bar 84 shows core loss in the above reactor 70 under the conditions that the core cross-section area S is 24 mm×25 mm=600 mm$^2$, the total gap length lgap is 2.1 mm×8=16.8 mm, the number of turns N is 70 turns, the coil current I is 70 A, the core material characteristics is 600 kW/m$^3$, the switching frequency f is 10 kHz, and the change in the magnetic flux density ΔB is 0.1 T. On the other hand, bar 86 in FIG. 11 shows core loss in the reactor 50 according to the present embodiment under the same conditions, except that the core cross-section area S is 50 mm×23 mm=1150 mm$^2$, the total gap length lgap is 2.7 mm×2=5.4 mm, and the number of turns N is 30 turns.

It will be understood that although the hysteresis loss in the reactor 50 according to the present embodiment is lower than the above reactor 70, the eddy-current loss is higher because of the larger core cross-sectional area. Regarding this point, bar 88 in FIG. 11 shows core loss obtained by preparing and evaluating the core members 56 having the material characteristics of 400 kW/m$^3$. In comparison to the bar 86, it can be confirmed that the eddy-current loss is reduced by almost half, and the total core loss is suppressed as low as the bar 84. Therefore, it is preferable for the reactor 50 according to the present embodiment to set the material characteristics of the pressurized powder magnetic core constituting the core members 56 to 400 kW/m$^3$ or less.

In order to improve the material characteristics of the core member as shown above, some methods are found to be effective, including increasing the composition amount of Si in the Fe—Si system magnetic powder, making the contact area among powder particles small by equalizing the shape (for example, to a spherical shape) and the size of the magnetic powder particles in the magnetic powdering process, making the insulation film around the magnetic powder particles thick, etc.

As described above, according to the reactor 50 of the present embodiment, it becomes possible to reduce cost required for materials and processing in comparison with reactors using an iron core with laminated electromagnetic steel plates or a compound magnetic core, while ensuring specific specifications for HVs by arranging the reactor 50 to include the reactor core 52 which is configured to have an annular shape by arranging a pair of the substantially U-shaped core members 56, each being made from Fe—Si system magnetic powder as one body, to oppose each other via two gaps G1, and the coils 54 which are wound around the leg portions 58 of each of the core members 56 opposing each other via the gaps G1.

Further, by setting the material characteristics of the core member 56 constituting the reactor 52 to 400 kW/$m^3$ or less, it becomes possible to suppress the coil loss to less than that in the conventional arts, and to maintain or improve gas mileage.

It should be noted that the present invention is not limited to the above embodiments, and various changes and improvements are possible.

Figure 12:
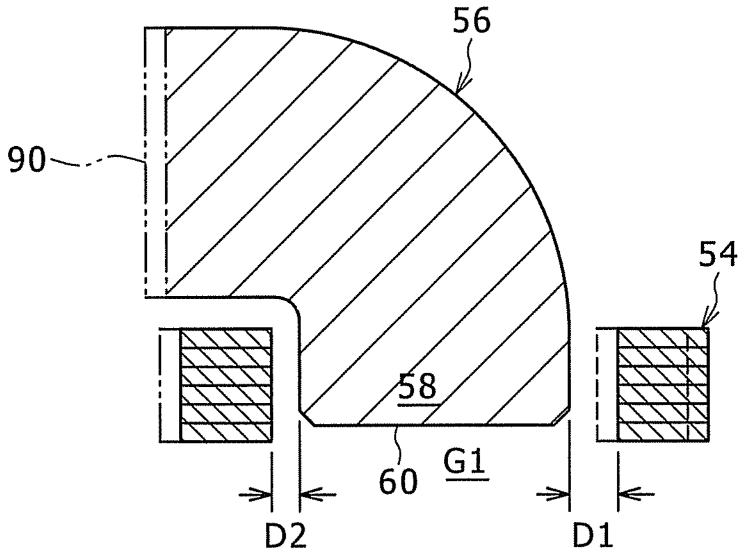
FIG. 12 is a partial horizontal cross-sectional view of a reactor with a space between a core member and coil arranged to be wider on an outer circumferential side.

For example, although the above embodiment is described by assuming that the distance D between the inner circumference of the coil and the outer peripheral surface of the core member is equal along the four circumferential sides, the present invention is not limited to such a configuration. As shown in FIG. 12, the distance D1 between the outer peripheral surface of the leg portions 58 of the core members 56 and the inner circumference of the coil 54 on the outer circumference side of the annular reactor core 52 may be larger than the distance D2 between the inner peripheral surface of the leg portions 58 of the core members 56 and the inner circumference of the coil 54 on the inner circumference side of the reactor core 52.

In this way, the leakage flux which flows out towards the outer peripheral side in the gaps G1 will have less linkage with the coil 54, and thus the coil loss can be further reduced. Similarly, the coil loss can be significantly reduced by making the distance between the upper side of the leg portions 58 of the core members 56 and the inner circumference of the coil 54, and the distance between the lower side of the leg portions 58 of the core members 56 and the inner circumference of the coil 54, longer than the distance on the inner circumference side as described above.

It should be noted that if the distance between the inner peripheral surface of the core members 56 and the inner circumference of the coil 54 of the reactor core 52 is set longer than the distance of the reactor 50 according to the present embodiment, it becomes necessary to extend the core members 56 as shown in the two-dot chain line 90 so as to avoid contact between the adjacent coils. This is not desirable because this will result in an increase of the material cost and enlarged size of the reactor.

Figure 13:
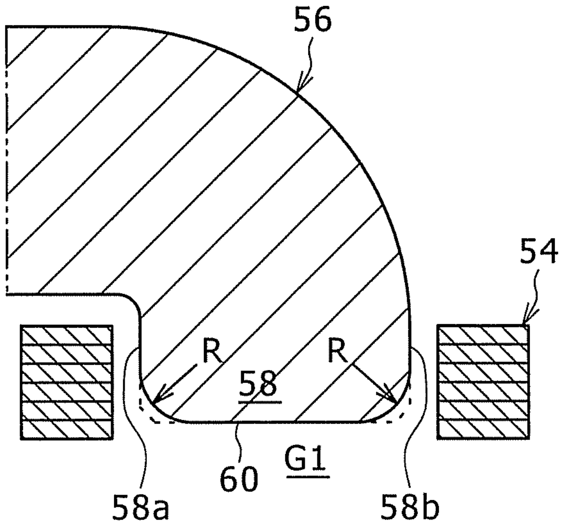
FIG. 13 is a partial horizontal cross-sectional view of a reactor with a corner cut-off process applied to a core member length portion.

Further, although the gaps G1 formed between the end surfaces 60 of the leg portions 58 of the core members 56 are described and illustrated as being equal from the outer circumference to the inner circumference of the annular reactor core 52, the gaps G1 are not limited to this configuration. As shown in FIG. 13, a corner cut-off process may be applied to the edge defined by the end surfaces 60 and the inner peripheral surface 58*a* of the leg portions 58 and the edge defined by the end surfaces 60 and the outer peripheral surface 58*b* of the leg portions 58 so as to make the gaps G1 wider at a position closer to the inner peripheral surface 58*a* and at a position closer to the outer peripheral surface 58*b* of the core members 56. Although the corner is formed to have a curved surface having a curvature radius R in this example, the corner cut-off process may be applied with a chamfer. In this way, as the width of the gaps G1 becomes larger, it becomes possible to suppress the leakage flux from flowing out towards the outer side, resulting in reduced occurrence of the coil loss. It is of course possible to use this cut-off process together with the example variation shown in FIG. 12.

[Reference Numerals ]

10 hybrid vehicle (HV), 12 engine, 13 temperature sensor, 14, 24 motors, 15, 22 shafts, 16 battery, 18 output shaft, 20 mechanical power distribution mechanism, 28 rotation speed sensor, 30 transmission, 32 axle, 34 drive wheel, 35 boost converter, 36, 38 inverters, 40 voltage sensor, 41 temperature sensor, 42 current sensor, 43 positive electrode bus, 44 negative electrode bus, 45, 51 smoothing capacitors, 46, 47 diodes, 48, 49 switching elements, 50, 70 reactors, 52, 72 reactor cores, 54, 74 coils, 54*a*, 54*b* coil portions, 56, 76 core members, 58, 78 leg portions, 58*a* inner peripheral surface, 59 base portion, 60 end surfaces of leg portions, 62, 84 gap plates, 64*a* input end, 64*b* output end, 66 connecting portion, 68 space, 77 core block, 100 controller, D, D1, D2 distances, G1, G2 gaps.

The invention claimed is:

1. A reactor used in a converter in an electric vehicle comprising a rotary electric machine used as an output source of power, a power supply for supplying driving electrical power to the rotary electric machine, and the converter converting DC voltage supplied by the power supply and outputting the converted voltage to the rotary electric machine, the reactor comprising:

a reactor core which is configured to have an annular shape in which a pair of substantially U-shaped core members, each having two leg portions and each being made from Fe—Si system magnetic powder as one body, are arranged such that the leg portions of each of the core members oppose the leg portions of the other core member with intervening gap plates; and a coil consisting of two coil portions wound around the leg portions of each of the core members opposing each other via the intervening gap plates, wherein a length of each of the intervening gaps is 2 to 3 mm and a total length of the two gaps included in the reactor core is 4 mm to 6 mm;

a vertical cross-sectional area of each of the core members is 400 to 2000 $mm^2$, the vertical cross-sectional area having a uniform rectangular shape from one of the leg portions to the other of the leg portions in a state where substantially U-shaped top and bottom surfaces are horizontally placed;

a total number of turns of the coils consisting of the two coil portions is 20 to 60 turns: and each projecting length A of the leg portions in the core members is formed shorter than a vertical length B in the rectangular-shaped vertical cross section of the core members.

2. The reactor according to claim 1, wherein material characteristics of a pressurized powder magnetic core constituting the reactor core are 400 kw/$m^3$ or less.

3. The reactor according to claim 2, wherein the material characteristics of the core members are defined to be 400 kW/$m^3$ or less by at least one of increasing a composition amount of Si in the Fe—Si system magnetic powder; making a contact area among powder particles in the core members small by equalizing a shape and a size of the magnetic powder particles in a powdering process of the magnetic powder; and making insulation film formed around the magnetic powder particles thick.

4. The reactor according to claim 1, wherein

The reactor is used for a converter mounted on a hybrid vehicle;

an inductance of the reactor is set such that magnetic saturation does not occur in the reactor core even with a ripple current flowing in the coil when a switching element included in the converter is switched at a drive frequency of 5 to 15 kHz.

5. The reactor according to claim 4, wherein the reactor has DC bias characteristics of 100 to 200 A.

6. The reactor according to claim 2, wherein the reactor is used for a converter mounted on a hybrid vehicle;

an inductance of the reactor is set such that magnetic saturation does not occur in the reactor core even with a ripple current flowing in the coil when a switching element included in the converter is switched at a drive frequency of 5 to 15 kHz.

7. The reactor according to claim 3, wherein the reactor is used for a converter mounted on a hybrid vehicle;

an inductance of the reactor is set such that magnetic saturation does not occur in the reactor core even with a ripple current flowing in the coil when a switching element included in the converter is switched at a drive frequency of 5 to 15 kHz.

* * * * *